United States Patent [19]
Schäfer et al.

[11] Patent Number: 5,299,461
[45] Date of Patent: Apr. 5, 1994

[54] FLUID FLOWRATE MEASURING APPARATUS

[75] Inventors: Klaus Schäfer, Munden; Peter Nissen, Rosdorf, both of Fed. Rep. of Germany

[73] Assignee: Fischer & Porter Company, Warminster, Pa.

[21] Appl. No.: 895,612

[22] Filed: Jun. 9, 1992

[30] Foreign Application Priority Data

Jun. 12, 1991 [DE] Fed. Rep. of Germany ........ 4119372

[51] Int. Cl.$^5$ .............................................. G01F 1/60
[52] U.S. Cl. ................................ 73/861.16; 73/861.12
[58] Field of Search ............ 73/861.16, 861.17, 861.12

[56] References Cited

U.S. PATENT DOCUMENTS

| | | | |
|---|---|---|---|
| 3,955,413 | 5/1976 | Steele et al. | 73/861.17 |
| 4,601,209 | 7/1986 | Amata | 73/861.17 |
| 4,704,908 | 11/1987 | Blatter | 73/861.17 |
| 4,723,449 | 2/1988 | Tiley | 73/861.17 |
| 4,727,755 | 3/1988 | Schmoock | 73/861.17 X |
| 4,733,191 | 3/1988 | Doll | 73/861.17 X |

FOREIGN PATENT DOCUMENTS 0219725 4/1987
2743954 4/1979 Fed. Rep. of Germany .
4010728 10/1991 Fed. Rep. of Germany .

OTHER PUBLICATIONS

English-language abstract of German Patent No. 4 010 728.
Abstract of German Patent No. 2 743 954.
Translation /German Patent No. 2 743 954.

*Primary Examiner*—Richard E. Chilcot, Jr.
*Assistant Examiner*—Elizabeth L. Dougherty
*Attorney, Agent, or Firm*—Ratner & Prestia

[57] ABSTRACT

Fluid flowrate measuring apparatus in which magnet coils, positioned symmetrically about a pipe through which fluid flows, are excited to generate magnetic fields during four periods of an excitation cycle which are additive during the first period of excitation, opposing during the second period of excitation, additive during the third period of excitation in an opposite sense to that during the first period, and opposing during the fourth period of excitation in an opposite sense to that during the second period. Electrodes, which sense fluid flow through the magnetic fields, develop signals representative of fluid flow through the pipe during the four excitation periods and these signals are processed to develop a flowrate measurement signal.

5 Claims, 2 Drawing Sheets

FLUID FLOWRATE MEASURING APPARATUS

BACKGROUND OF THE INVENTION

The present invention relates to circuitry for measuring the volume flowrate of a fluid in a pipe which has two magnet coils positioned on opposite sides of the pipe and at least one pair of electrodes mounted on the inner surface of the pipe symmetrical to a plane defined by the pipe axis and the common axis of the coils. Also included are an excitation circuit for the coils which produces aiding and opposing magnetic fields and an evaluation circuit connected to the electrodes which produces a measurement signal proportional to the volumetric flowrate.

Circuitry of this type is known from German Patent 2 743 954. The use of opposing magnetic fields serves to recognize the presence of a non-symmetrical flow profile and is used to correct the flow signal. According to the European Patent Application 90 106 783 (not yet published), this method also serves to determine whether the pipe is full or not.

In the known circuits, it is possible that saturation may occur, which produces unstable signals due to electrochemical potential variations between the fluid and the electrodes.

SUMMARY OF THE INVENTION

The purpose of the present invention is to provide a circuit, of the type mentioned above, which leads to stable measurement signals.

The solution of this task is a circuit characterized by a timing and phase shifting circuit connected to the coils to control a similar but 90° phase shifted periodic bipolar excitation of both coils, separate holding circuits connected to the electrodes which will hold in a first holding circuit the electrode signals generated during the time both magnet coils produce fields in one direction and in a second holding circuit electrode signals generated during the time the magnet coils produce fields in the other direction, and holding the electrode signals generated during the time the magnet coils produce fields directed toward each other in a third holding circuit, and holding the electrode signals generated during the time the magnet coils produce fields directed away from each other in a fourth holding circuit. A first summing circuit is provided to sum the signals in the first holding circuit and the second holding circuit to produce the first summed signal, and a second summing circuit is provided to sum the signals in the third holding circuit and the fourth holding circuit to produce the second summed signal. A compensation circuit is provided in which the first summed signal and the second summed signal are used to produce the corrected output signal.

The invention will be described by use of an example illustrated by the accompanying figures.

DETAILED DESCRIPTION OF THE INVENTION

Figure 1:
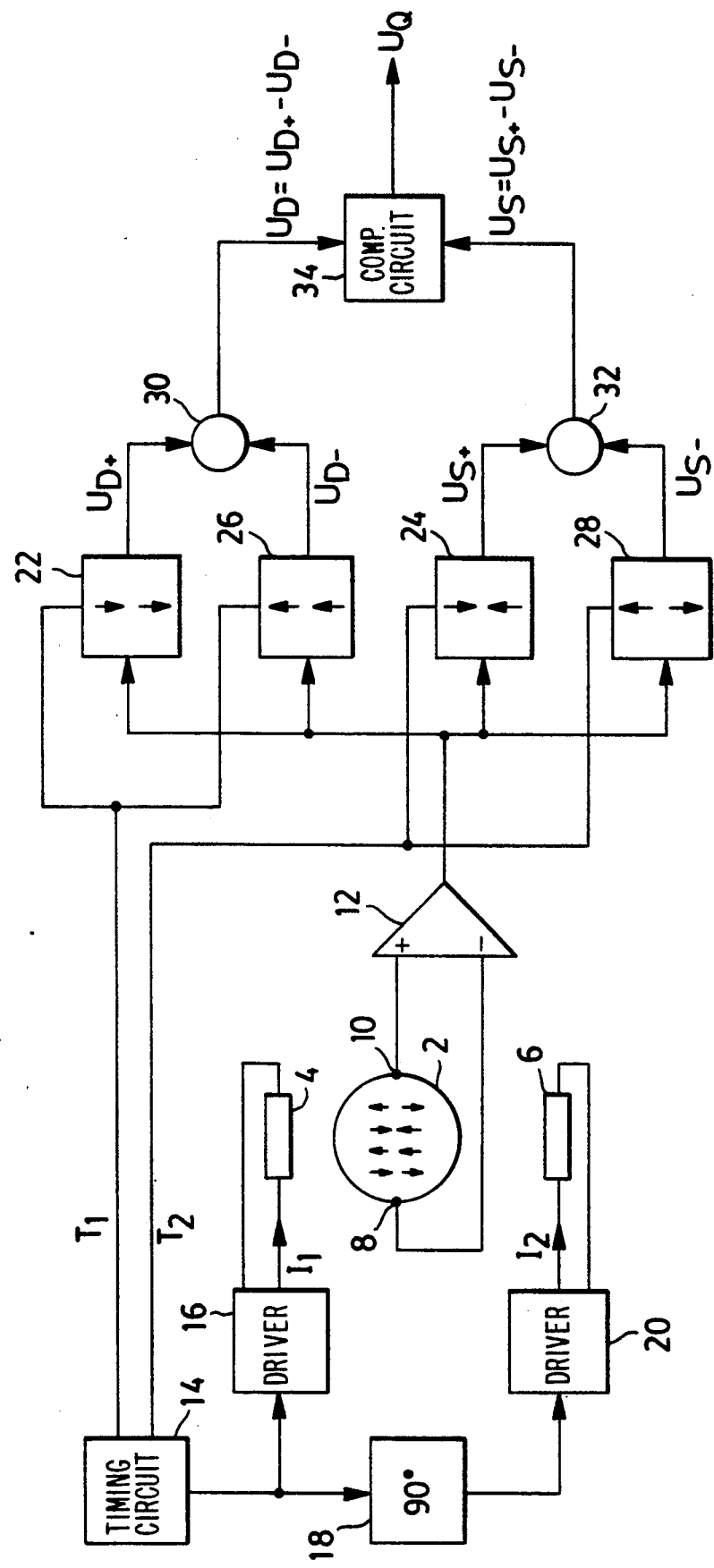
FIG. 1 is a block diagram of a circuit constructed in accordance with the present invention.

The circuit shown in FIG. 1 measures the volumetric flowrate of a fluid flowing in a pipe 2. On each opposite side of the pipe is mounted a magnet coil 4,6. A pair of electrodes 8,10 (more pairs can be provided as described in the unpublished European Patent Application 90 106 783.5) is mounted on the inner surface of the pipe 2 symmetrical to a plane defined by the pipe axis and the common axis of the coils 4,6. By means of the magnet coils 4,6 and an excitation circuit, to be described in more detail, there are produced in the pipe 2 magnetic fields aiding in both directions and opposing toward and away from each other as indicated by the four sets of arrows in the pipe 2. Another circuit, to be described in more detail, is connected to an amplifier 12 across the electrodes 8,10 for the generation of the flow proportional measurement signal $U_Q$.

Figure 2:
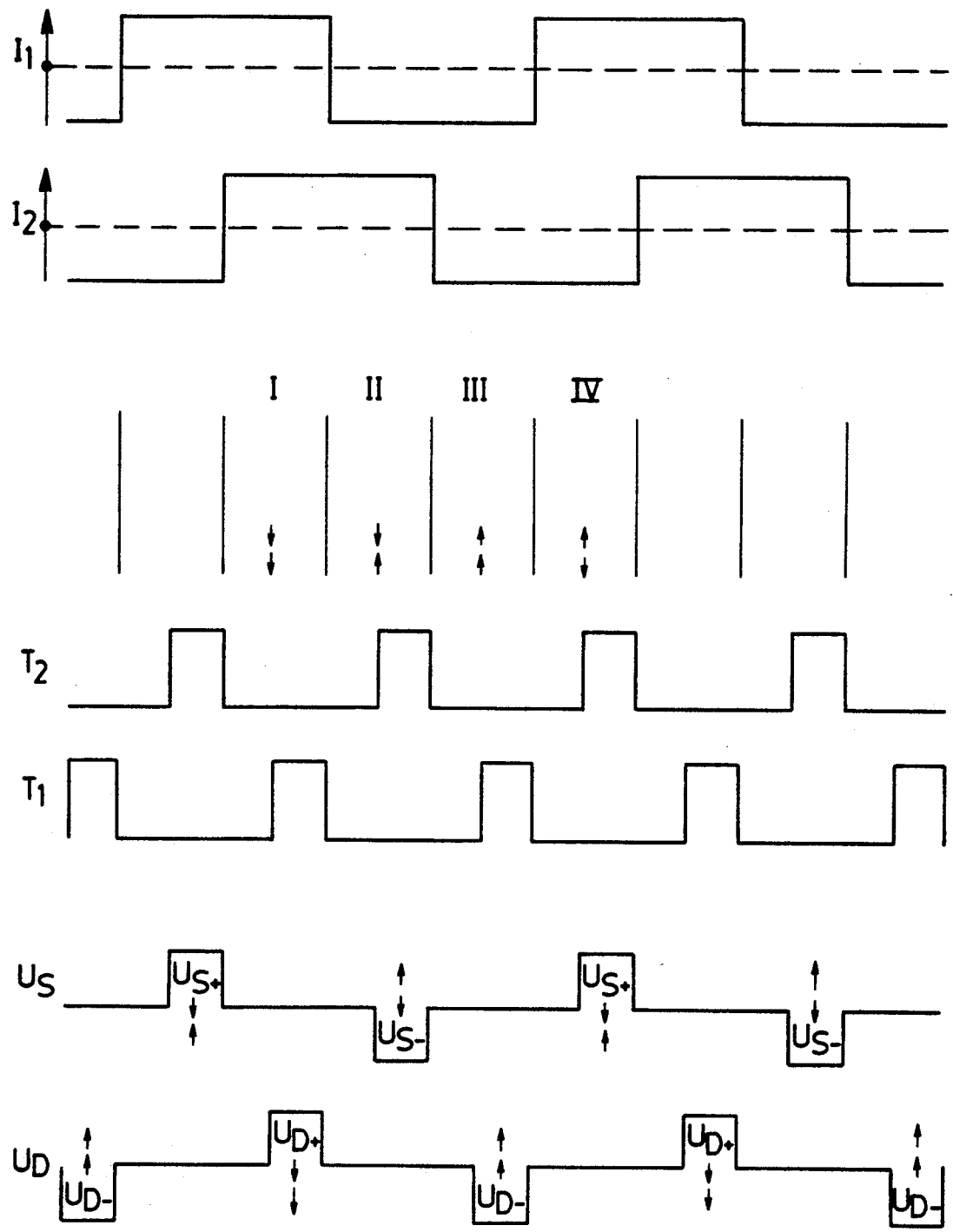
FIG. 2 shows the signal waveforms at different points in the circuit of FIG. 1.

A timing and phase shifting circuit is connected to the coils 4,6 which together with driver 16 produces an excitation current $I_1$ in coil 4 and over a 90° phase shifter 18 and driver 20 produces an excitation current $I_2$ in coil 6 as shown by waveforms $I_1$ and $I_2$ of FIG. 2. Because of the 90° phase shift, there occurs in the identically long periods I, II, III, IV a repetitious changing of the magnetic field direction in the coils 4,6, namely, the fields from each of the coils first are the same in one direction, then are in opposite directions away from each other, then are the same in the opposite direction to the first, and lastly are in opposite directions toward each other. The amplified electrodes signals are stored in holding circuit 22 during period I, in holding circuit 24 during period II, in holding circuit 26 during period III, and in holding circuit 28 during period IV. The periods are controlled by the timing signals $T_1$ and $T_2$ which are generated in timing circuit 14 and which open and close the holding circuits 22,24,26,28. The voltages $U_{D+}$ and $U_{D-}$, corresponding to the two aiding magnetic field periods stored in holding circuits 22 and 26, are summed in circuit 30. The voltages $U_{S+}$ and $U_{S-}$, corresponding to the two opposing magnetic field periods stored in holding circuits 24 and 28, are summed in circuit 32. The summed signals $U_D$ and $U_S$ are shown in FIG. 2. The summed signal $U_D$ and the summed signal $U_S$ are compared in a compensation circuit 34, so that the correct flow proportional measurement signal $U_Q$ is produced.

Because the excitation currents $I_1$ and $I_2$ have the same frequency and the same timing, no permanent polarization occurs at the electrodes 8,10. Therefore, the measurement signal can be evaluated continuously.

The circuit not only takes into account non-symmetrical profiles of the flow stream in the pipe 2 but also takes into account the flow in partially full pipes 2, especially when more than one pair of electrodes are installed, which requires modification of the circuit.

What is claimed is:

1. Fluid flowrate measuring apparatus comprising:
   a pipe having an axis;
   first and second magnet coils positioned symmetrically on opposite sides of said pipe and having a common axis for generating magnetic fields extending through said pipe;
   means for exciting said first and said second magnet coils to generate over an excitation cycle:
   (a) first and second magnetic fields by said first and said second magnet coils, respectively, which are aiding during a first period of said excitation cycle,
   (b) third and fourth magnetic fields by said first and said second magnet coils, respectively, which are opposing during a second period of said excitation cycle, (c) fifth and sixth magnetic fields by said first and second magnet coils, respectively, which are opposite to said first and said second magnetic fields, respectively, and aiding during a third period of said excitation cycle, and (d) seventh and eighth magnetic fields by said first and said second magnet coils, respectively, which are opposite to said third and said fourth magnetic fields, respectively, and opposing during a fourth period of said excitation cycle;

first and second electrodes positioned symmetrically to a plane defined by said axis of said pipe and said common axis of said magnet coils for developing signals representative of fluid flow through said magnetic fields;

a first holding circuit for holding said signals developed during said first period of said excitation cycle;

a second holding circuit for holding said signals developed during said second period of said excitation cycle;

a third holding circuit for holding said signals developed during said third period of said excitation cycle;

a fourth holding circuit for holding said signals developed during said fourth period of said excitation cycle;

a first summing circuit for summing said signals held in said first and said third holding circuits;

a second summing circuit for summing said signals held in said second and said fourth summing circuits;

and means for comparing the sum developed by said first summing circuit with the sum developed by said second summing circuit to develop a flowrate measurement signal proportional to the flowrate of fluid flowing through said pipe.

2. Fluid flowrate measuring apparatus according to claim 1 wherein said exciting means include timing means for supplying timing signals which define said periods of said excitation cycle and control said holding circuits to hold said electrode signals developed during the respective periods of said excitation cycle.

3. Fluid flowrate measuring apparatus comprising:
a pipe having an axis;
first and second magnet coils positioned symmetrically on opposite sides of said pipe and having a common axis for generating magnetic fields extending through said pipe;
magnet exciting means including:

(a) timing circuit means for supplying timing signals which define first, second, third and fourth time periods of an excitation cycle over which said first and said second magnet coils are excited, (b) a first driver circuit responsive to said timing signals for driving said first magnet coil, (c) a phase shifting circuit for shifting the phase of said timing signals by 90°, and (d) a second driver circuit responsive to said 90° phase shifted timing signals for driving said second magnet coil to excite said first and said second magnet coils and generate over said excitation cycle:

(a) first and second magnetic fields by said first and said second magnet coils, respectively, which are aiding during said first period of said excitation cycle, (b) third and fourth magnetic fields by said first and said second magnet coils, respectively, which are opposing during said second period of said excitation cycle, (c) fifth and sixth magnetic fields by said first and said second magnet coils, respectively, which are opposite to said first and said second magnetic fields, respectively, and aiding during said third period of said excitation cycle, and (d) seventh and eighth magnetic fields by said first and said second magnet coils, respectively, which are opposite to said third and said fourth magnetic fields, respectively, and opposing during said fourth period of said excitation cycle;

first and second electrodes positioned symmetrically to a plane defined by said axis of said pipe and said common axis of said magnet coils for developing fluid flow signals representative of fluid flow through said magnetic fields;

a first holding circuit controlled by said timing signals for holding said fluid flow signals developed during said first period of said excitation cycle;

a second holding circuit controlled by said timing signals for holding said fluid flow signals developed during said second period of said excitation cycle;

a third holding circuit controlled by said timing signals for holding said fluid flow signals developed during said third period of said excitation cycle;

a fourth holding circuit controlled by said timing signals for holding said fluid flow signals developed during said fourth period of said excitation cycle;

a first summing circuit for summing said fluid flow signals held in said first and said third holding circuits;

a second summing circuit for summing said fluid flow signals held in said second and said fourth summing circuits;

and means for comparing the sum developed by said first summing circuit with the sum developed by said second summing circuit to develop a flowrate measurement signal proportional to the flowrate of fluid flowing through said pipe.

4. Fluid flowrate measuring apparatus according to claim 3 wherein said:

(a) first magnet coil is driven to generate said first and said third magnetic fields over a first half cycle of 180° of said excitation cycle, (b) first magnet coil is driven to generate said fifth and said seventh magnetic fields over a second half cycle of 180° of said excitation cycle, (c) second magnet coil is driven to generate said second and said fourth magnetic fields over a first half cycle of 180° of said excitation cycle phase shifted 90° from said first half cycle of 180° of said excitation cycle of said first and third magnetic fields, and (d) second magnet coil is driven to generate said sixth and said eighth magnetic fields over a second half cycle of 180° of said excitation cycle phase shifted 90° from said first half cycle of 180° of said excitation cycle of said fifth and seventh magnetic fields.

5. A circuit arrangement for an apparatus for measuring the volume flowrate of a fluid flowing through a pipe having an axis comprising two coils located along a common axis on opposite sides of said pipe, and at least one pair of electrodes positioned adjacent an inner face of said pipe symmetrically to a plane defined by said axis of said pipe and said common axis of said coils, an excitation circuit for said coils permitting excitation of said coils for producing magnetic fields in the same directions and magnetic fields in opposite directions, and an evaluation circuit connected to said electrodes to derive a measured value signal proportionate to the volume flowrate of said fluid, wherein clock generating and phase shifting means are associated with said coils to control a periodically bipolar excitation of both coils similar but 90° phase shifted relative to excitation by said excitation circuit, a holding circuit is provided for separately holding the signals generated by said electrodes during the time the magnetic fields are produced in the same first directions in a first holding member, during the time the magnetic fields are produced in the same second directions opposite to the first directions in a second holding member, during the time the magnetic fields are produced in opposite directions toward each other in a third holding member, and during the time the magnetic fields are produced in opposite directions away from each other in a fourth holding member, a first summing circuit is provided for summing the signals held in said first holding member and in said second holding member for producing a first summing signal, a second summing circuit is provided for summing the signals held in said third holding member and in said fourth holding member for producing a second summing signal, and a correction circuit is provided in which said first summing signal is corrected by said second summing signal for producing said measured value signal.

* * * * *